(12) United States Patent
Enoki et al.

(10) Patent No.: US 10,733,218 B2
(45) Date of Patent: Aug. 4, 2020

(54) SYSTEM, METHOD, AND PROGRAM FOR AGGREGATING DATA

(71) Applicant: International Business Machines Corporation, Armonk, NY (US)

(72) Inventors: Miki Enoki, Tokyo (JP); Issei Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 14/970,741

(22) Filed: Dec. 16, 2015

(65) Prior Publication Data

US 2016/0179981 A1 Jun. 23, 2016

(30) Foreign Application Priority Data

Dec. 17, 2014 (JP) .................. 2014-255623

(51) Int. Cl.
*G06F 16/31* (2019.01)

(52) U.S. Cl.
CPC ................... *G06F 16/319* (2019.01)

(58) Field of Classification Search
CPC .......................... G06F 17/30622; G06F 16/319
USPC ......................................................... 707/800
See application file for complete search history.

(56) References Cited

U.S. PATENT DOCUMENTS

| | | | | |
|---|---|---|---|---|
| 8,838,648 B2* | 9/2014 | Sismanis | ............... | G06F 16/217 707/791 |
| 9,087,090 B1* | 7/2015 | Cormier | ............... | G06F 16/9535 |
| 2007/0136274 A1 | 6/2007 | Takuma et al. | | |

(Continued)

FOREIGN PATENT DOCUMENTS

| | | |
|---|---|---|
| JP | 6103307 | 9/1992 |
| JP | 2001022787 | 7/1999 |

(Continued)

OTHER PUBLICATIONS

Fagin, R., et al., "Optimal Aggregation Algorithms for Middleware", Journal of Computer and System Sciences, Jun. 2003, pp. 1-43, vol. 66, Issue 4.

(Continued)

*Primary Examiner* — Hosain T Alam
*Assistant Examiner* — Saba Ahmed
(74) *Attorney, Agent, or Firm* — Fleit Intellectual Property Law; Thomas S. Grzesik

(57) ABSTRACT

A system to reduce a required memory area (storage capacity) and save time and effort for updating target attributes in aggregation processing is disclosed. The system for aggregating data includes an index storing unit for storing DtoK indices arranged in predetermined order, each of the indices specifying a list of attributes included in a target data item from identification information of the target data item, and a word list that is a list of attributes included in a plurality of the target data items, and an aggregation processing unit for finding, for each attribute, target data items including the attribute and executing aggregation processing for aggregating attributes whose relation with the target data items meets a predetermined standard. A link is created for each attribute in the word list for sequentially following an element in the index for each target data item, and target data items are found based thereon.

20 Claims, 14 Drawing Sheets

(56) References Cited

U.S. PATENT DOCUMENTS

| | | | | |
|---|---|---|---|---|
| 2010/0088428 A1* | 4/2010 | Hendrickson | ........... | H03M 7/04 709/242 |
| 2011/0231454 A1* | 9/2011 | Mack | ................. | G06F 16/2228 707/803 |
| 2014/0372412 A1* | 12/2014 | Humphrey | ........ | G06F 16/90335 707/722 |

FOREIGN PATENT DOCUMENTS

| JP | 2001222555 | 7/2000 |
|---|---|---|
| JP | 20070156739 | 12/2005 |
| JP | 2007156739 | 6/2007 |
| JP | 2011013984 | 1/2011 |

OTHER PUBLICATIONS

Zhang, J., et al., "Performance of Compressed Inverted List Caching in Search Engines", Proceedings of the 17th International Conference on the World Wide Web, Apr. 21-25, 2008, pp. 1-10.

\* cited by examiner

```
class Entry {
    int keywordId;      //
    int score;          //
    int nextDocId;      //
    int nextEntryIndex; //
}

DL[i] = new Entry[10]; //
```

FIG. 7(a)

```
java.util.TreeMap<Integer, Entry[]> DLList = new java.util.TreeMap<>();
```

FIG. 7(b)

```
int newDocId = 100;
Entry[] newDL = new Entry[10];
DLList.put(newDocId, newDL);
```

FIG. 7(c)

```
DLList.pollFirstEntry(); //
```

FIG. 7(d)

```
class Entry {
  int keywordId;   // KEYWORD ID
  int score;       // SCORE OF KEYWORD
  Entry next;      // LINK TO NEXT ENTRY
}

DL[] = new Entry[10]; // GENERATE DOCUMENT INCLUDING 10 KEYWORDS
```

FIG. 9

SYSTEM, METHOD, AND PROGRAM FOR AGGREGATING DATA

CROSS-REFERENCE TO RELATED APPLICATION

This application is based upon and claims priority from prior Japanese patent application number 2014-255623, filed Dec. 17, 2014, the entire contents of which are hereby incorporated by reference herein.

TECHNICAL FIELD

The present invention relates to a system, a method, and a program for aggregating data, and particularly relates to a technology for aggregating predetermined attributes in an aggregation of target data items that include the predetermined attributes.

BACKGROUND ART

As one of aggregation operations executed on a large number of data items having plural types of attributes, there is an aggregation operation that finds top k types of attributes appearing in an aggregation of data items designated as a processing target (hereinafter referred to as target data items) in descending order of a point value (weight, score) given to each attribute according to a particular rule. This aggregation operation is also called as Top-k, for example. Suppose that the target data item is a document (text), and that the attributes are words included in the document. Also, suppose that the point value given to each word, which is an attribute, is the number of appearance of the word in all documents. In this case, finding the top k words appearing most frequently only in a plurality of documents that meet a particular condition is one example of the Top-k aggregating operation.

As a conventional technology of this kind, there is a technology that searches through text using a first index (DOC_TO_KEY index) that specifies a list of keywords included in text from identification information of the text and a second index (KEY_TO_DOC index) that specifies a list of texts that include a keyword from identification information of the keyword (see Patent Literature 1). Here, the text is one example of the above described "target data item", and the keyword is one example of the above described "attribute". In this conventional technology, once receiving an input of a search condition, a search time with the first index and a search time with the second index are estimated. Then, one of the indices that facilitates a faster search is then used for a search operation.

CITATION LIST

Patent Literature

[Patent Literature 1] JP2007-156739A

SUMMARY OF INVENTION

Technical Problems

Processing that uses the KEY_TO_DOC index (hereinafter abbreviated as KtoD index) is executed as follows, for example. Firstly, attributes are sequentially selected in descending order of their frequency of appearance in the whole of the collection of target data items. Next, it is determined whether a list of target data items including the selected attributes meets a search condition. Next, top k attributes that are included in more target data items meeting the search condition are selected in descending order of the number of the target data items. The selected attributes then become the result of aggregation. This processing, however, would be quite lengthy when the number of types of attributes to be aggregated is large.

Processing that uses the DOC_TO_KEY index (hereinafter abbreviated as DtoK index) is executed as follows, for example. Firstly, target data items meeting a search condition are selected. Next, a list of attributes corresponding to identification information of each of the selected target data items is obtained. The number of the target data items including the attributes in the lists is then aggregated on per attribute basis. This processing, however, would be quite lengthy when the number of target data items is large.

The conventional technology of Patent Literature 1, which uses the above described two types of indices, estimates a time needed for both types of processing that respectively use the first and second indices and chooses the processing that can be executed in a shorter time. This conventional technology, however, consumes a large amount of memory area (storage capacity) for storing indices because both of the KtoD index and the DtoK index are used.

Also, in the case of the KtoD index, the index needs to be recreated when a target data item is added for dealing with the added target data item and attributes thereof, which makes update processing complicated.

It is thus an object of the present invention to reduce a required memory area (storage capacity) and to save time and effort needed for updating target data items and attributes in the above described aggregation processing in comparison with the case where both of the KtoD index and the DtoK index are used.

Solution to Problems

In order to accomplish the above object, the present invention is achieved as a system described below. This system is a system for aggregating data, including an index storing unit for storing indices arranged in a predetermined order, each of the indices specifying a first list of attributes included in a target data item of aggregation processing from identification information of the target data item, each element of the first list including information about an attribute of the attributes, and also storing a second list of attributes included in a plurality of the target data items, and an aggregation processing unit for finding, for each attribute, the target data items including the attribute and executing aggregation processing for aggregating attributes whose relation with the target data items meets a predetermined standard. A link is created for each attribute in the second list for sequentially following an element in the first list for each target data item, and the aggregation processing unit finds the target data items including each attribute on the basis of the link created for the attribute.

More preferably, the link in the first list is created by including, in each element of the first list for each target data item, information specifying another element including information about the same attribute as the each element in another first list nearest and subsequent to the first list.

More preferably, the attributes in the second list are sorted in descending order of their frequencies of being included in each of the plurality of the target data items.

More preferably, each element of the first list for each target data item further includes a value given to the attribute identified by the information included in the element. And elements of the first list are sorted in the order based on the value.

More preferably, the value given to the attribute is a weight value based on a relation between the attribute and the target data items including the attribute, and the elements of the first list are sorted in descending order of the value.

More preferably, the first lists respectively corresponding to the target data items are arranged in reverse chronological order of their creation so that the oldest first list is positioned at the end of the order, and wherein, when a newly created first list is added, the newly created first list is positioned at the top of the order and the link relating to an attribute included in an element of the newly created first list is updated.

More preferably, the first lists respectively corresponding to the target data items are arranged in reverse chronological order of their creation so that the oldest first list is positioned at the end of the order, and when the oldest first list is deleted, the first list at the end of the order is deleted and the link relating to an attribute included in an element of the deleted first list is updated.

The present invention is also achieved as a system described below. This system is a system for aggregating data, including an index storing unit for storing indices each including a list registering attributes included in a target data item of aggregation processing, a determination unit for determining whether aggregation processing is to be executed in a first technique or a second technique, the first technique being a technique for finding, for each attribute, target data items including the attribute and aggregating attributes whose relation with the target data items meets a predetermined standard, the second technique being a technique for finding, for each of target data items, attributes included in the target data item and aggregating attributes whose relation with the target data items meets a predetermined standard, and an aggregation processing unit for executing aggregation processing in either the first technique or the second technique in accordance with the determination made by the determination unit. The indices create a relation between identical attributes included in different target data items, and the aggregation processing unit finds the target data items including the attribute on the basis of the relation between identical attributes in the indices when executing aggregation processing in the first technique.

The present invention is also achieved as a method described below. This method is a method of aggregating data executed in a system including an index storing unit for storing indices arranged in a predetermined order, each of the indices specifying a first list of attributes included in a target data item of aggregation processing from identification information of the target data item, each element of the first list including information about an attribute of the attributes, and also storing a second list of attributes included in a plurality of the target data items, and a link structure for sequentially following, for each element in the second list, an element in the first list for each target date item, and an aggregation processing unit for executing aggregation processing of attributes, the method including the steps, executed by the aggregation processing unit, of finding the number of the target data items including each attribute on the basis of the link created for the attribute, and aggregating a top predetermined number of the attributes included in a larger number of the target data items and outputting a result of the aggregation.

The present invention is also achieved as a method described below. This method is a method of aggregating data executed in a system including an index storing unit for storing indices each including a list registering attributes included in a target data item of aggregation processing, an aggregation processing unit for executing aggregation processing of the attributes, and a determination unit for determining a technique for aggregation processing executed by the aggregation processing unit, the method including the steps of determining, by the determination unit, whether aggregation processing is to be executed in a first technique or a second technique, the first technique being a technique for finding, for each attribute, target data items including the attribute and aggregating attributes whose relation with the target data items meets a predetermined standard, the second technique being a technique for finding, for each of target data items, attributes included in the target data item and aggregating attributes whose relation with the target data items meets a predetermined standard, in case the determination unit determines that aggregation processing is to be executed in the first technique, finding, by the aggregation processing unit, the target data items including the attribute on the basis of a relation between identical attributes in the indices creating the relation between identical attributes included in different target data items, and in case the determination unit determines that aggregation processing is to be executed in the second technique, finding, by the aggregation processing unit, the attributes included in each of target data items and aggregating attributes whose relation with the target data items meets a predetermined standard on the basis of the indices.

Furthermore, the present invention is achieved as a program that controls a computer to achieve each function of the above described system or a program that causes a computer to execute a process corresponding to each step described above. This program can be provided by distributing a magnetic disk, an optical disk, a semiconductor memory, or other storage media in which the program is stored, or by distributing the program via a network.

Advantageous Effects of Invention

According to the present invention, for each attribute to be aggregated, the number of target data items including the attribute is found, and a top predetermined number of attributes included in a larger number of target data items are aggregated without separately creating the KtoD index. This enables to reduce a required memory area (storage capacity) and to save time and effort needed for updating target data items and attributes, in comparison with the case where both of the KtoD index and the DtoK index are used.

BRIEF DESCRIPTION OF DRAWINGS

FIG. 7 is a diagram illustrating an example of implementing a DtoK index using Java programming language, wherein FIG. 7(a) illustrates coding for setting an entry of a DtoK index, FIG. 7(b) illustrates coding for generating a DtoK list, FIG. 7(c) illustrates coding for adding a new DtoK index, and FIG. 7(d) illustrates coding for deleting a DtoK index;

FIG. 9 is a diagram illustrating another example of implementing a DtoK index using Java programming language, wherein coding for setting an entry of a DtoK index is illustrated;

DESCRIPTION OF EMBODIMENT

An embodiment of the present invention will now be described with reference to the accompanying drawings. An aggregation system according to the embodiment executes aggregation processing that finds a predetermined base number of attributes that appear in an aggregation of target data items having a plurality of types of attributes in accordance with some kind of a rule. In the following, an example is described wherein documents narrowed down as a processing target by some kind of means, such as searching, are used as an example of target data items, and words included in each document are used as an example of attributes. Also, in this example, the rule of aggregation is to select a base number (k) of words that most frequently appear in all of the narrowed-down documents.

<System Configuration>

Figure 1:
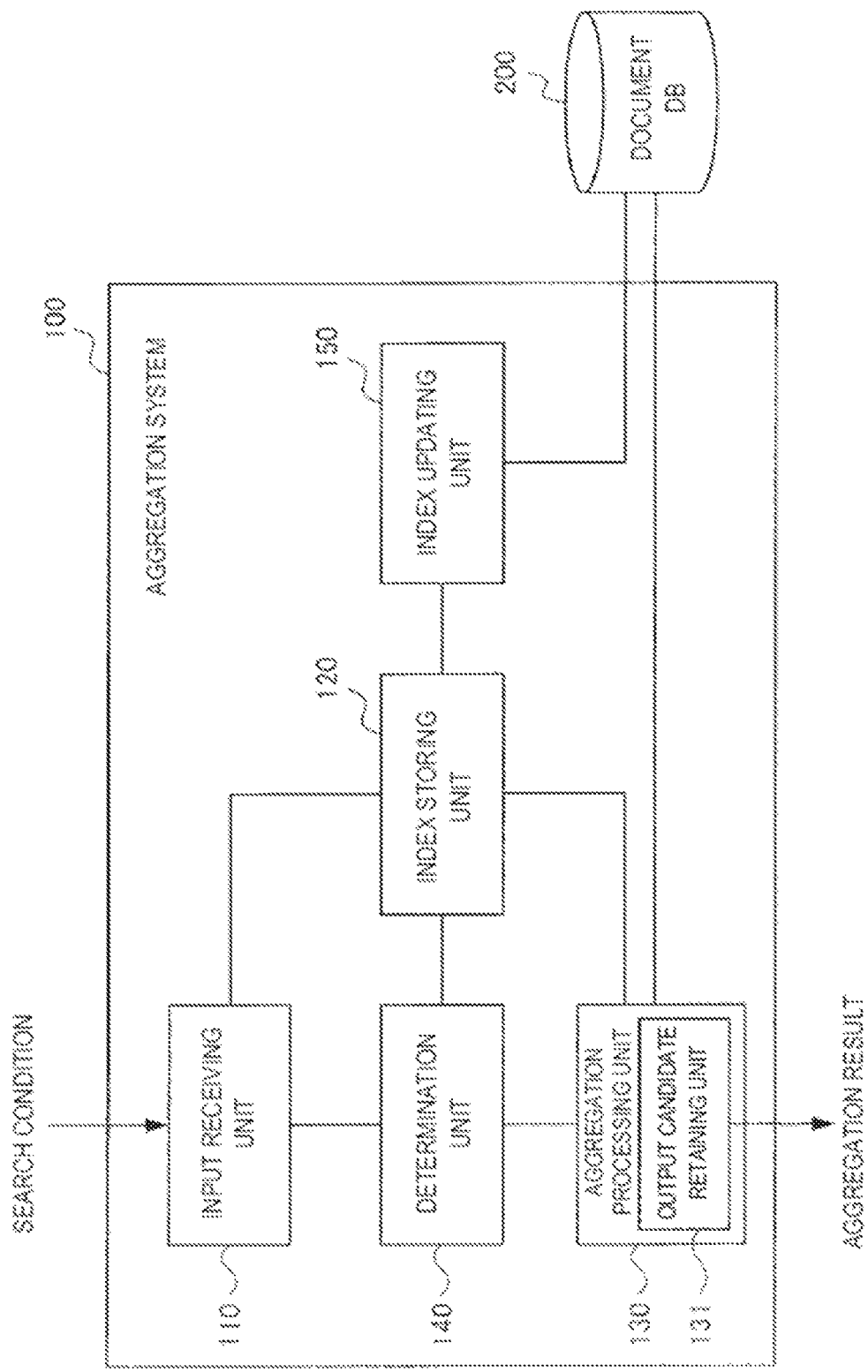
FIG. 1 is a diagram illustrating a configuration of an aggregation system according to an embodiment of the present invention.

FIG. 1 is a diagram illustrating a configuration of an aggregation system according to the embodiment. As illustrated in FIG. 1, an aggregation system 100 of the embodiment is connected to a document DB (database) 200. The document DB 200 stores documents that can be a processing target. For example, documents that can be a target of aggregation processing are those that are designated (narrowed down) from the documents stored in the document DB 200 through searching based on some kind of a search condition, for example.

In the embodiment, the aggregation system 100 designates (narrows down) documents as a target of aggregation processing via searching through documents stored in the document DB 200 based on some kind of a search condition. For example, the aggregation system 100 searches documents that include particular words, and uses the obtained documents as a target of aggregation processing. Then, among the words included in the obtained documents, a predetermined number (k) of words that appear most frequently in the documents are found. As illustrated in FIG. 1, the aggregation system 100 of the embodiment includes an input receiving unit 110, an index storing unit 120, an aggregation processing unit 130, a determination unit 140, and an index updating unit 150.

The input receiving unit 110 receives an input for executing aggregation processing. Particularly, the input receiving unit 110 receives an input of a narrowing condition (such as a search condition) for designating documents as a target of aggregation processing. Also, the input receiving unit 110 receives an input of information that specifies attributes to be aggregated.

The index storing unit 120 stores indices used for aggregation processing. In the embodiment, a DtoK index is used that specifies a list of words included in a document from identification information of that document. The DtoK index is created for each document stored in the document DB 200. Also, in the embodiment, a link is created between identical words in lists of words of the DtoK indices created for documents. In other words, identical words included in the DtoK indices of different documents are related to each other. This enables, for example, to use a word as a keyword to identify documents that include the keyword by following the link of that word. The detail of this data structure of the DtoK index will be described later.

The aggregation processing unit 130 identifies and aggregates words that frequently appear in the documents designated as a target of the aggregation processing (hereinafter referred to as designated documents) among documents stored in the document DB 200. Specifically, the aggregation processing unit 130 aggregates the top k words in terms of their frequency of appearance, wherein k is preliminarily determined. The aggregation processing unit 130 of the embodiment executes aggregation processing using one of the following techniques.

One technique is to find, for each word to be aggregated (attribute to be aggregated), the number of documents that include the word and then select the top k words that are included in more documents. This technique is hereinafter referred to as the first technique. In a more common term, the first technique is a technique that finds, for each attribute, target data items that have the attribute and then aggregates attributes whose relation with the target data items meets a predetermined standard.

Another technique is to find, for each designated document, words included in the designated document and then select the top k words that are included in more designated documents. This technique is hereinafter referred to as the second technique. In a more common term, the second technique is a technique that finds, for each of target data items, attributes included in the target data item and then aggregates attributes whose relation with the target data items meets a predetermined standard.

In the embodiment, the processing of the first technique is executed by following the link created between words in the DtoK indices. The operation of the aggregation processing unit 130 will be described later in detail.

The aggregation processing unit 130 also includes an output candidate retaining unit 131. The output candidate retaining unit 131 retains candidates for words that will be output as an aggregation result, wherein the candidates are obtained in the course of the aggregation processing of the aggregation processing unit 130. That is, the aggregation processing unit 130 sequentially determines, in the processing of the first technique or the second technique, whether each of the words to be aggregated is the one that will be output as an aggregation result. If it is determined that a word is the one that will be output as an aggregation result, then the word is retained in the output candidate retaining unit 131. In other words, a word retained in the output candidate retaining unit 131 is the one that has already been processed in the middle of executing the aggregation processing of the aggregation processing unit 130. After the aggregation processing completes, the aggregation processing unit 130 outputs the words retained in the output candidate retaining unit 131 as an aggregation result.

The determination unit 140 determines whether the aggregation processing of the aggregation processing unit 130 is to be executed in the first technique or the second technique. The processing in the first technique described above would be quite lengthy when the number of types of words to be aggregated is large. On the other hand, the processing in the second technique would be quite lengthy when the number of documents on which the aggregation processing is executed is large. Thus, the determination unit 140 determines whether the aggregation processing is to be executed in the first technique or the second technique, so that the aggregation processing of the aggregation processing unit 130 can be executed efficiently. A method of making the determination is not specifically limited. For example, the aggregation processing may be executed in the first technique when the number of documents on which the aggregation processing is executed is larger than a predetermined threshold, and may be executed in the second technique when the number of documents is equal to or less than the threshold. Or, the processing time needed for executing the aggregation processing in both of the first technique and the second technique may be respectively estimated and the aggregation processing may be executed in the technique that completes in a shorter estimated processing time.

The index updating unit 150 updates indices stored in the index storing unit 120. Specifically, the index updating unit 150 adds a DtoK index corresponding to a newly added document or deletes a DtoK index in accordance with the update of the document DB 200 (adding or deleting of a document). Also, the index updating unit 150 updates a DtoK list (described later) for managing DtoK indices in accordance with the update of the DtoK indices. Also, the index updating unit 150 creates a set of DtoK indices stored in the index storing unit 120 by repeating update processing that adds a new DtoK index. The update processing of the index updating unit 150 will be described later in detail.

<Configuration of Indices>

Figure 2:
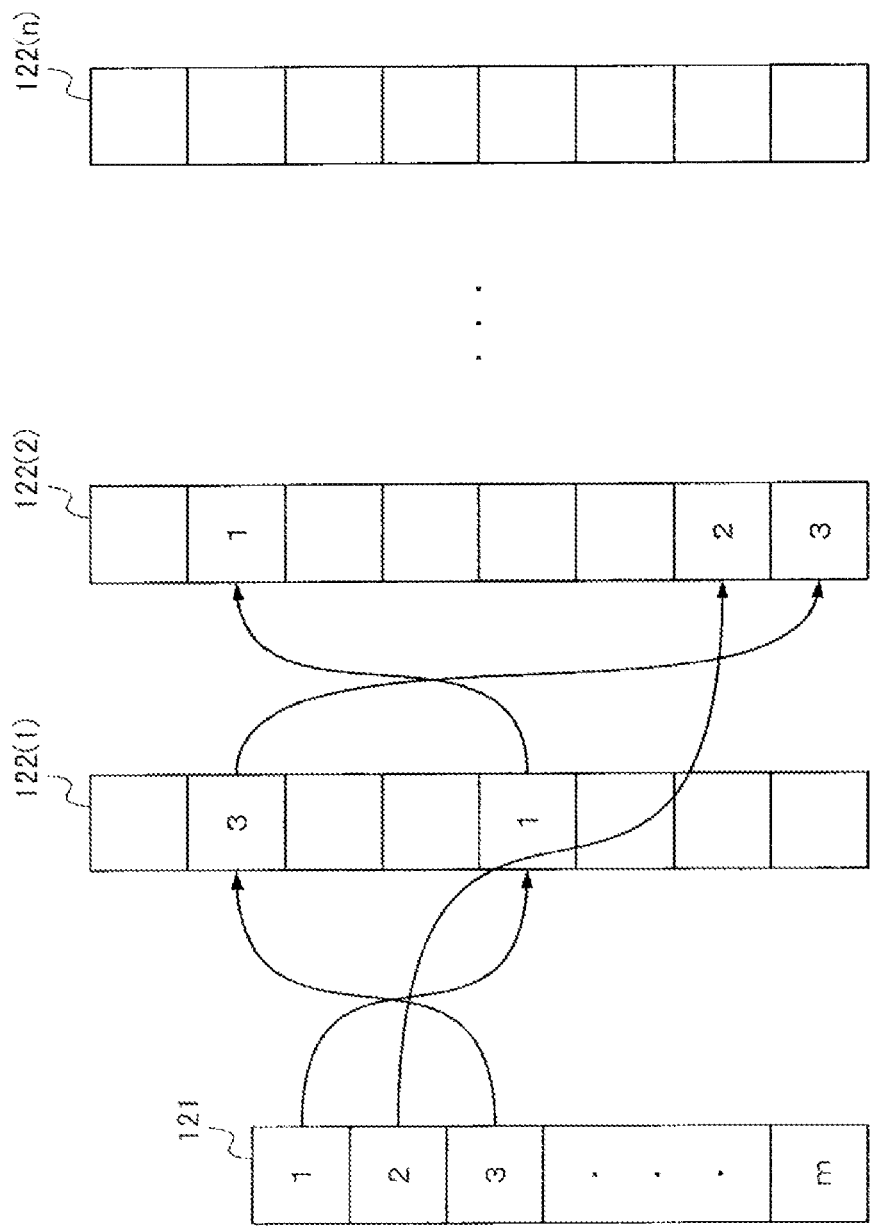
FIG. 2 is a diagram illustrating a configuration of indices stored in an index storing unit of the embodiment.

FIG. 2 is a diagram illustrating a configuration example of indices stored in the index storing unit 120 of the embodiment. As illustrated in FIG. 2, a word list 121 and a DtoK index 122 for each document stored in the document DB 200 are provided in the embodiment. In other words, the DtoK index 122, which is created for each document (target data item), is a list of words included in the document (attributes included in the target data item) (first list). In the example illustrated in FIG. 2, the DtoK indices 122 exist for n documents and have branch numbers (1) to (n), starting from a document that has most recently stored (the newest document) in the document DB 200. That is, reference numeral 122($n$) indicates the DtoK index 122 for a document that has initially stored in the document DB 200 among n documents (the oldest document), and reference numeral 122(1) indicates the DtoK index 122 for a document that has most recently stored in the document DB 200. That is, the DtoK indices 122 are arranged in reverse chronological order of their creation, wherein the DtoK index 122 that has initially created is positioned at the end of the order.

Also, although not specifically illustrated, the index storing unit 120 stores the DtoK list for managing the DtoK indices 122 in order of their branch numbers illustrated in FIG. 2. This DtoK list registers identification information di (i: 1≤i≤n) of the DtoK indices 122 in ascending order of the subscript "i". Therefore, in the DtoK list, the identification information of the leading DtoK index 122 is d1, and the identification information of the trailing DtoK index 122 is dn. Also, the subscript "i" of the identification information di corresponds to the branch numbers (1) to (n) of the DtoK indices 122 illustrated in FIG. 2. The aggregation processing unit 130 can randomly access each of the DtoK indices 122(1) to 122($n$) via the DtoK list. Also, the DtoK list has a list structure in which an entry (element) can be added to and deleted from the leading and trailing ends of the list. This kind of list can be realized by using java.util.LinkedList of Java®, for example.

The word list 121 is a list of identification information of all words included in the documents stored in the document DB 200 (second list). The word list 121 registers, for each word, the identification information of the word, the number of documents that include the word (hereinafter referred to as appearance document number), and information about a linked destination of the word. The information about a linked destination will be described later in detail. Also, the word list 121 has a map structure in which identification information of each word can be randomly accessed and a sort order of the appearance document numbers is maintained. This kind of list (map) can be realized by using java.util.TreeMap of Java, for example.

In the example illustrated in FIG. 2, the word list 121 stores m words (identification information "1" to "m"). Words stored in the word list 121 are arranged in descending order of the number of documents that include each word. In other words, in the word list 121, words, each of which is an attribute of target data items, are sorted in descending order of their frequency of appearance in all documents that is the target data items. When the document DB 200 is updated and a document is added, an entry corresponding to a word exclusively included in the added document, if such word exists, is added to the trailing end of the word list. That is, in the case of the word list 121 illustrated in FIG. 2, entries will be added subsequent to the identification information "m" as "m+1", "m+2", etc.

The DtoK index 122 is created for each document stored in the document DB 200 and is an index that references information of words included in each document. The DtoK index 122 registers, for each word included in a corresponding document, identification information of the word, a point value given to the word, and information about a linked destination of the word. The information about a linked destination will be described later in detail. The point value given to a word may be arbitrarily defined and set. For example, a weight value according to the TF-IDF (Term Frequency-Inverse Document Frequency) may be used as the point value. In the embodiment, the number of appearance of a word in each document is used as the point value of that word. Also, words stored in the DtoK index 122 are arranged in descending order of the point value.

In the embodiment, each word in the word list 121 is linked with identical words registered in the DtoK indices 122(1) to 122($n$). In the embodiment, the link is created so as to start from the identification information registered in the word list 121 and extend through the DtoK indices 122 in order of their branch numbers (that is, from newer documents to older documents). In other words, the links between words, which are attributes, are created in specific order according to the order of DtoK indices 122(1) to 122(*n*) of documents, which are target data items. Also, if an identical word does not exist in the DtoK index 122 having the subsequent branch number, then the link is created with an identical word included in another DtoK index 122 that is nearest among the DtoK indices 122 having the further subsequent branch numbers.

Specifically, a link created for a word having identification information "1" (hereinafter referred to as word "1") will now be described with reference to FIG. 2. The link of the word "1" is firstly created from the word "1" in the word list 121 to the word "1" in the DtoK index 122(1). Next, the link is extended from the word "1" in the DtoK index 122(1) to the word "1" in the DtoK index 122(2). The link of the word "1" is further extended in order of the branch numbers of the DtoK indices 122, although not illustrated.

If a document does not include the word "1", however, the DtoK index 122 of that document is skipped and the link extends to the subsequent DtoK index 122. For example, suppose that the document corresponding to the DtoK index 122(3), which is not illustrated, does not include the word "1". In this case, the link from the word "1" in the DtoK index 122(2) skips the DtoK index 122(3) and extends to the word "1" in the DtoK index 122 (4). Similarly, if the document corresponding to the DtoK index 122 (4) also does not include the word "1", then the link from the word "1" in the DtoK index 122(2) extends to the word "1" in the DtoK index 122(5).

In the example illustrated in FIG. 2, the word having identification information "2" is not included in the document corresponding to the DtoK index 122(1). Thus, the link of the word having identification information "2" (hereinafter referred to as word "2") skips the DtoK index 122(1) and is created between the word "2" in the word list 121 and the word "2" in the DtoK index 122(2).

Therefore, in the case of the link between words in the indices according to the embodiment, each word included in the DtoK index 122(*n*) is the trailing end of the link of that word. The trailing end of the link of a word that is not included in the DtoK index 122(*n*) exists in any one of the DtoK indices 122(1) to 122(*n*−1) preceding the DtoK index 122(*n*).

The link between words of the indices according to the embodiment may be created by known various means. As one example, the link may be created by writing, to each entry of a word in the word list 121 and in the DtoK indices 122(1) to 122(*n*), information that specifies the DtoK index 122 and its entry to be linked. As another example, the link may be created by writing, to each entry of a word in the word list 121 and in the DtoK indices 122(1) to 122(*n*), a pointer to an entry of the identical word included in the DtoK index 122 of another document.

<Operation of Aggregation Processing Unit>

The aggregation processing unit 130 executes a process of identifying and aggregating words that appear frequently in all documents designated as a target of aggregation processing in either the first technique or the second technique. The first technique is a process that finds, for each word (attribute) to be aggregated, the number of designated documents that include the word and selects the top k words that are included in a larger number of designated documents. Also, the second technique is a process that finds, for each designated document, words included in the document and selects the top k words that are included in a larger number of designated documents.

Here, the second technique is similar to the known aggregation processing that uses a conventional DtoK index. In the embodiment, it is also possible to execute the conventional processing by using the DtoK index 122 described above with reference to FIG. 2. That is, the aggregation processing unit 130 firstly creates a list of words included in each designated document on the basis of the DtoK index 122 of that document. The aggregation processing unit 130 then selects the top k words that are included in a larger number of documents on the basis of the created list.

On the other hand, the first technique is based on the same idea as the known aggregation processing that uses the KtoD index in the conventional art. In the embodiment, however, processing is executed by using not the KtoD index but the link between words in the DtoK indices 122 described above with reference to FIG. 2.

Figure 3:
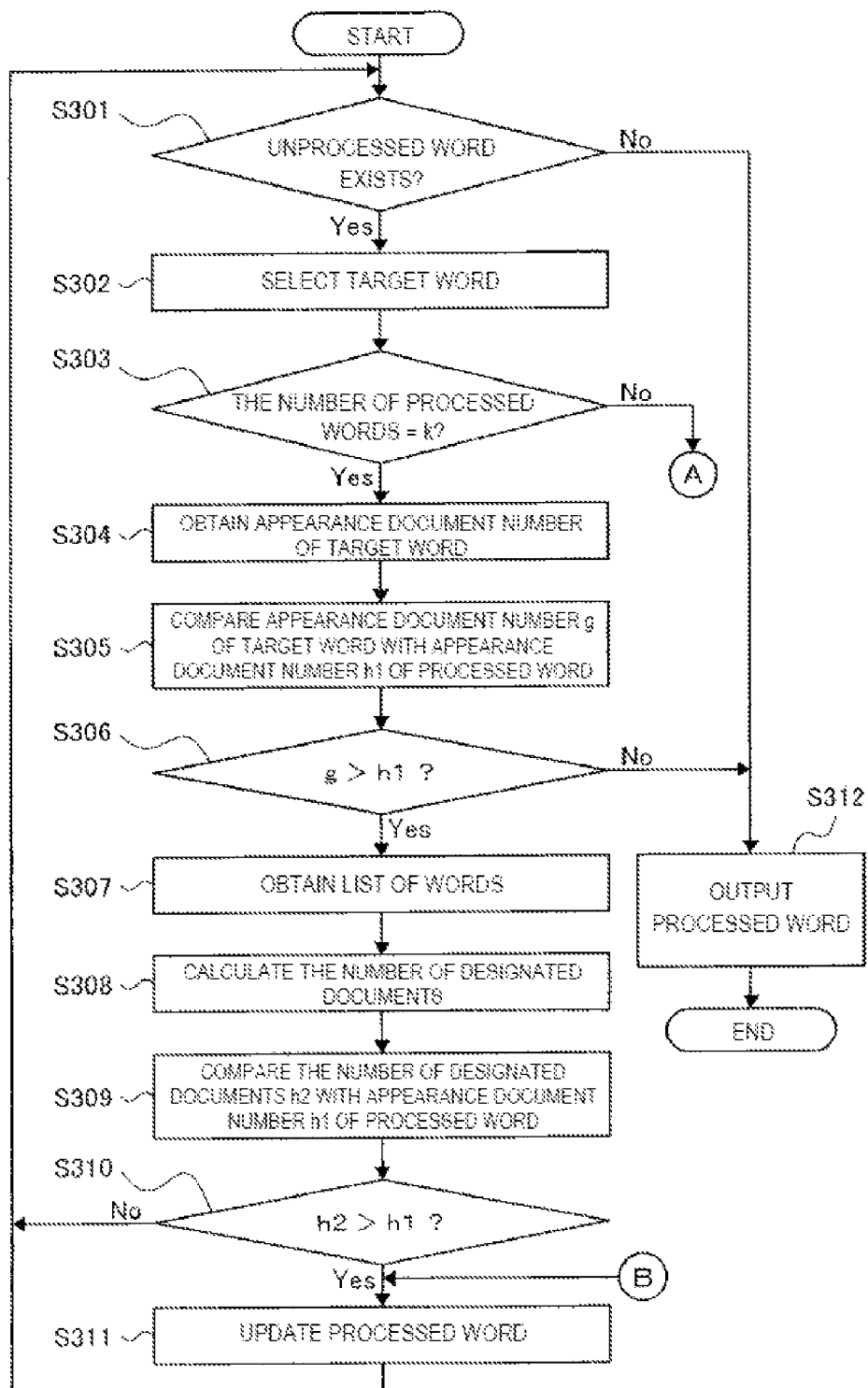
FIG. 3 is a flow chart illustrating the operation of an aggregation processing unit when aggregation processing is executed in a first technique.
Figure 4:
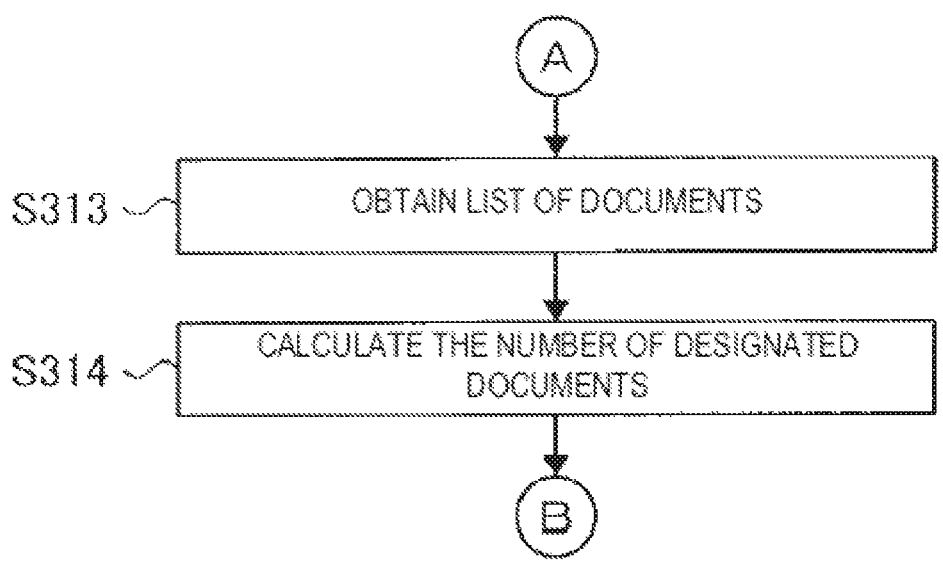
FIG. 4 is a flow chart illustrating the operation of an aggregation processing unit when aggregation processing is executed in the first technique.

FIGS. 3 and 4 are flow charts illustrating the operation of the aggregation processing unit 130 when aggregation processing is executed in the first technique. The aggregation processing unit 130 processes words stored in the word list 121 while focusing on each of the words, starting from a word having the identification information "1", in a sequential manner, for example. That is, the aggregation processing unit 130 firstly determines whether an unprocessed word exists (S301). If one or more unprocessed words exist (Yes in S301), then the aggregation processing unit 130 selects a word to be processed (hereinafter referred to as target word) from the unprocessed words (S302). A word that is selected as a target word is, for example, the word whose value of the identification information is the smallest among the unprocessed words. Words stored in the word list 121 are arranged in descending order of the number of documents that include each word. Thus, a word having the smallest value of the identification information is the word that is included in the largest number of documents among the unprocessed words.

Next, the aggregation processing unit 130 determines whether the number of processed words (hereinafter referred to as processed words) retained in the output candidate retaining unit 131 is equal to the aggregation number of k (S303). If the number of processed words is equal to k (Yes in S303), then the aggregation processing unit 130 obtains an appearance document number "g" of the target word (S304). The appearing document number "g" is the number of documents that include the target word among all document stored in the document DB 200.

Next, the aggregation processing unit 130 compares the appearance document number "g" of the target word with an appearance document number "h1" of each processed word retained in the output candidate retaining unit 131 (S305). Here, the appearance document number "h1" of a processed word is the number of designated documents that include the processed word. That is, the appearance document number "h1" of a processed word is the number of documents, among all documents stored in the document DB 200, that include the processed word and that are also designated as a target of aggregation processing. As described later, the appearance document number of a processed word is retained in the output candidate retaining unit 131. If the appearance document number "g" of the target word is larger than the appearance document number "h1" of any processed word (Yes in S306), then the aggregation processing unit 130 follows the link of the target word in the DtoK indices 122 and obtains a list of documents including the target word (S307).

Next, the aggregation processing unit 130 calculates the number of documents that meet a narrowing condition (designated documents) among the documents in the obtained list (S308). Then, the aggregation processing unit 130 compares the number of the calculated designated documents "h2" with the appearance document number "h1" of each processed word (S309). If the number of the designated documents "h2" is larger than the appearance document number "h1" of any processed word (Yes in S310), then the aggregation processing unit 130 selects the top k words from the target word and the processed words that are included in a larger number of appearance documents. Then, the aggregation processing unit 130 associates each of the selected words with its appearance document number and stores them in the output candidate retaining unit 131. This updates the processed words which are the candidates for words to be output as an aggregation result (S311). Because the upper limit of the number of processed words is k, the information of a word whose appearance document number was the smallest of all processed words before the update is executed is deleted from the output candidate retaining unit 131 for the sake of adding the target word of the current processing to the processed words. The process of the aggregation processing unit 130 then returns to S301. If an unprocessed word still exists (Yes in S301), then the process from S302 is executed.

If the appearance document numbers "h1" of all processed words are equal to or larger than the designated document number "h2" (No in S310), then the target word of the current processing is not added to the processed words. Thus, the processed words stored in the output candidate retaining unit 131 are not updated, and the process of the aggregation processing unit 130 returns to S301. If an unprocessed word still exists (Yes in S301), then the process from S302 is executed.

Suppose that, in S303, the number of processed words is less than the total number k (No in S303). In this case, the target word of the current processing inevitably becomes a candidate of a word to be output as an aggregated result. Thus, the aggregation processing unit 130 follows the link of that target word in the DtoK indices 122 to obtain a list of documents that includes the target word (S313). The aggregation processing unit 130 then calculates the number of documents that meet a narrowing condition (designated documents) among the documents included in the obtained list (S314). After that, the aggregation processing unit 130 associates the target word with the calculated number of the designated documents and stores them in the output candidate retaining unit 131. This updates the processed words that are candidates for words to be output as an aggregation result (S311). Because in this case the number of the processed words after the update is equal to or less than k, none of the processed words is deleted from the output candidate retaining unit 131. The process of the aggregation processing unit 130 then returns to S301. If an unprocessed word still exists (Yes in S301), the process from S302 is executed.

On the other hand, if no unprocessed word exists in S301 (No in S301), it means that the above described processing has been done for all words. Thus, the aggregation processing unit 130 outputs k of the processed words stored in the output candidate retaining unit 131 as an aggregation result (S312) and completes the processing.

Also, suppose that, in S306, the appearance document numbers "h1" of all processed words are equal to or more than the appearance document number "g" of the target word (No in S306). In this case, because the words in the word list 121 are arranged in descending order of the number of documents that include each word, the appearance document number of a target word in subsequent processing will never be larger than the appearance document number "h1" of any processed word. That is, the processed words will never be updated in subsequent processing. Thus, the aggregation processing unit 130 outputs k of the processed words stored in the output candidate retaining unit 131 as an aggregation result (S312) and completes the processing.

As described above, according to the process illustrated in S305 and S306, the aggregation processing completes when the possibility of updating the processed words is lost, even if some of the words in the word list 121 have not processed yet. This enables to reduce the number of repeats of the process from S301 to S311 to less than the number of words in the word list 121.

As described above, the embodiment can execute the process in either the first technique or the second technique, using the DtoK indices 122 in which links are created between the stored words. Therefore, it is possible to reduce the amount of memory area (storage capacity) needed for retaining indices, in comparison with the case where a KtoD index is provided for executing the process in the first technique.

If the amount of memory area (storage capacity) needed for retaining indices is to be simply saved, then the indices may be compressed by an appropriate data compressing method to reduce the data size. It is difficult, however, to update the compressed indices in accordance with update of the document DB 200 (adding or deleting of a document). Thus, when the document DB 200 is updated, the indices themselves need to be recreated and recompressed. In the embodiment, on the other hand, it is possible to reduce the amount of memory area (storage capacity) needed for retaining indices, as described above, while enabling the DtoK indices 122 to be updated in accordance with update of the document DB 200 as described below, although in a somewhat restricted manner.

<Creation and Update of DtoK Index>

In the embodiment, when the document DB 200 is updated, the word list 121 and the DtoK indices 122 saved in the index storing unit 120 are also updated. Regarding the word list 121, the number of documents that include each of the stored words changes due to addition or deletion of a document. Thus, the index updating unit 150 of the aggregation system 100 of the embodiment re-sorts the words in the word list 121 each time the document DB 200 is updated, for example. Also, the index updating unit 150 of the embodiment updates the word list 121 by adding identification information of a word that is exclusively included in an added document, if such word exists, to the trailing end of the word list.

Next, creation and update of the DtoK index 122 will be described. The DtoK index 122 is created by executing, for each of n documents stored in the document DB 200, an update process that adds a new DtoK index 122 corresponding to one document.

Figure 5:
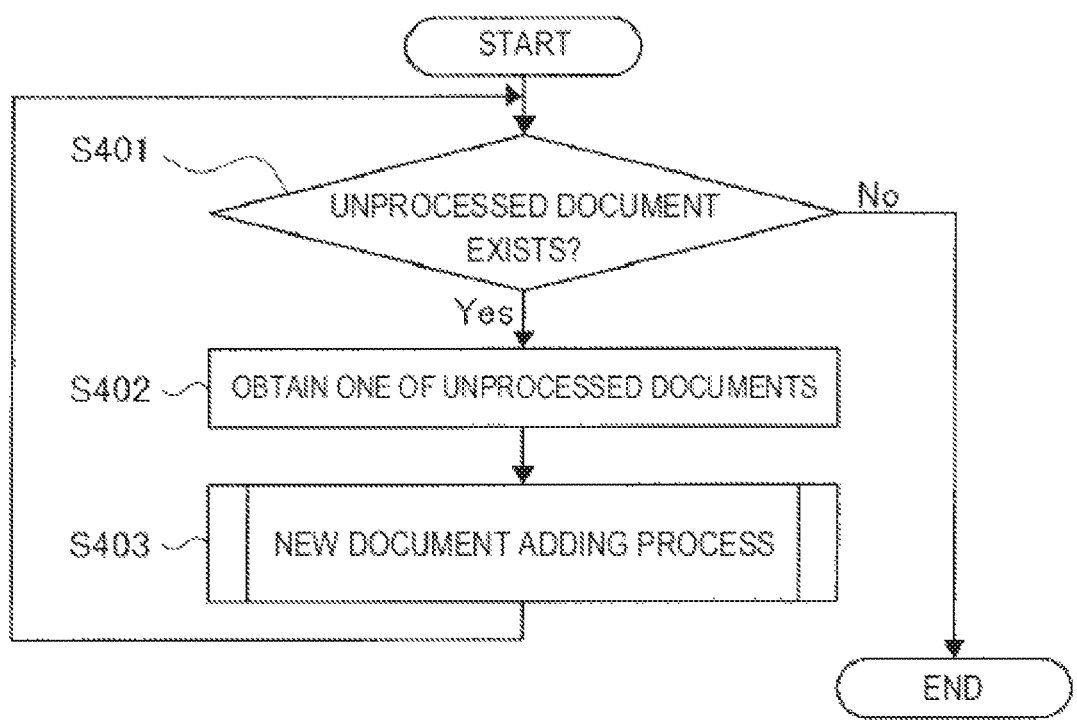
FIG. 5 is a flow chart illustrating steps of creating a DtoK index.

FIG. 5 is a flow chart illustrating the steps of creating the DtoK index 122. As illustrated in FIG. 5, the index updating unit 150 firstly determines if an unprocessed document (a document for which the DtoK index 122 is not created yet) exists among documents stored in the document DB 200 (S401). If one or more unprocessed documents exist (Yes in S401), then the index updating unit 150 obtains one of the unprocessed documents (S402). The index updating unit 150 then executes a new document adding process for the obtained document (S403). The process of these steps is executed for each document stored in the document DB 200, and the index updating unit 150 completes the process when no more unprocessed document exists (No in S401).

Figure 6:
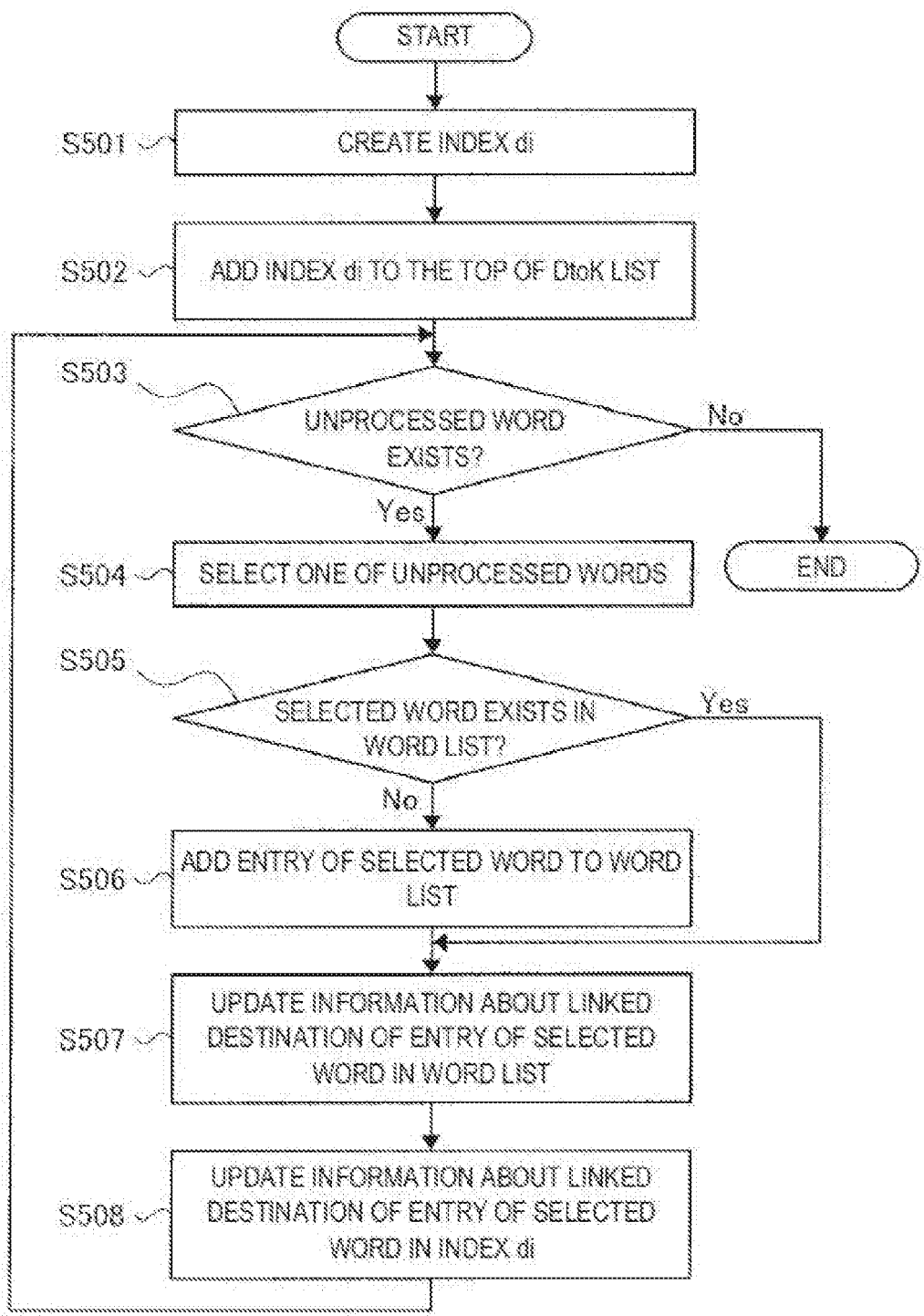
FIG. 6 is a flow chart illustrating the steps of a new document adding process.

FIG. 6 is a flow chart illustrating the steps of the new document adding process. As illustrated in FIG. 6, the index updating unit 150 firstly creates the DtoK index 122 corresponding to one of documents obtained as a processing target (S501). The DtoK index 122 created is hereinafter referred to as an index di by using the identification information di of each DtoK index 122 registered in the DtoK list (the index is also identified as "INDEX Di" in S501 illustrated in FIG. 6). Also, a document corresponding to an index di is hereinafter referred to as a document di. The index updating unit 150 adds the created index di to the top of the DtoK list (S502).

Next, the index updating unit 150 determines whether an unprocessed word (that is, a word whose link is not updated) exists among the words registered in the index di (words included in the document di) (S503). If one or more unprocessed words exist (Yes in S503), then the index updating unit 150 selects one of the unprocessed words (S504) and determines whether the selected unprocessed word is registered in the word list 121 (S505). If the selected word is registered (Yes in S505), then the index updating unit 150 updates the information about a linked destination registered in the entry of that word in the word list 121 so that the information indicates the entry of that word in the index di that is being processed (S507).

On the other hand, if the selected word is not registered in the word list 121 (No in S505), then the index updating unit 150 adds an entry of the selected word to the word list 121 (S506). Then, the index updating unit 150 updates information about a linked destination of the entry created in the word list 121 so that the information indicates the entry of that word in the index di that is being processed (S507).

Next, the index updating unit 150 updates the information about a linked destination registered in the entry of that word in the index di so that the information indicates the entry of that word in another DtoK index 122 that is immediately subsequent to the index Di in the DtoK list (S508).

The index updating unit 150 executes the process of above described S503 to S508 for each word included in the index di, and completes the process when no more unprocessed word exists (No in S503).

The process of adding the DtoK index 122 is as described above. Next, the process of deleting the DtoK index 122 stored in the index storing unit 120 will be described. As described above with reference to FIG. 2, the DtoK index 122 of the embodiment includes links created for words. Thus, when the DtoK index 122 is deleted, the links of words in that DtoK index 122 needs to be reset. Therefore, it is not easy to delete the DtoK index 122 arbitrarily. It is easy, however, to delete the DtoK index 122 corresponding to the end of the DtoK list (that is, the oldest DtoK index 122 having identification information dn). This is because all words in that DtoK index 122 are the ends of the links of the words. In this case, it is only necessary to delete the DtoK index 122 having the identification information dn (illustrated in FIG. 2 as the DtoK index 122(n)) from the index storing unit 120 and to delete the entry at the end of the DtoK list.

<Implementation of Index>

Figure 8:
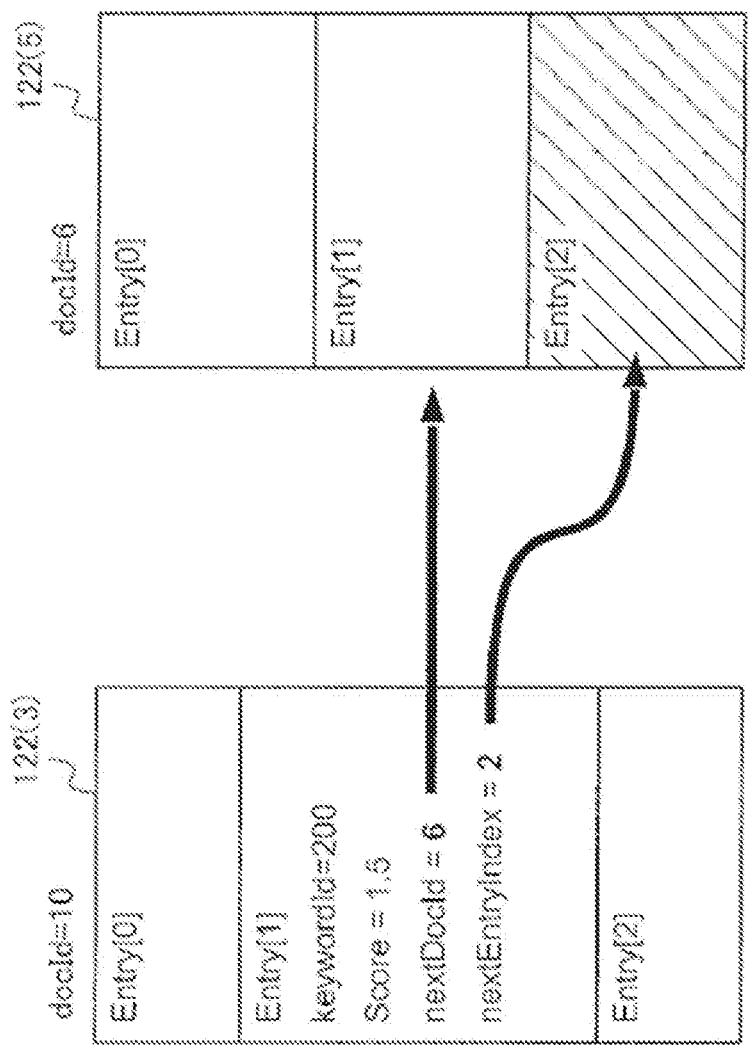
FIG. 8 is a diagram illustrating an example of implementing a DtoK index using Java programming language, wherein a link created by the coding in FIG. 7 is illustrated.

FIGS. 7 and 8 are diagrams illustrating an example of implementing the DtoK index 122 of the embodiment using Java programming language. FIG. 7 is a diagram illustrating an example of coding, wherein FIG. 7(a) illustrates coding for setting an entry of the DtoK index 122, FIG. 7(b) illustrates coding for generating a DtoK list, FIG. 7(c) illustrates coding for adding a new DtoK index 122, and FIG. 7(d) illustrates coding for deleting the DtoK index 122. FIG. 8 is a diagram illustrating a link created by the coding illustrated in FIG. 7.

According to the implementation illustrated in FIG. 7, a link between words (entries) in the DtoK indices 122 is achieved by specifying the linked DtoK index 122 and the position of the entry by using numerical values. In the example illustrated in FIG. 7(a), the linked DtoK index 122 is specified with the value of "nextDocId". Here, DocID is a document ID described later. The position of the entry in the linked destination is specified with the value of "nextEntryIndex". Also, "keywordId" is identification information of each word. And "score" is a point value given to each word. Also, as illustrated in FIG. 7(b), the DtoK list "DLList" is generated by using "java.util.TreeMap" class in the Java standard library. This DtoK list "DLList" stores the whole DtoK index 122 (illustrated in FIG. 7 as DL[i]) in ascending order of the identification information di (DL[1] to DL[n]).

Also, in the example illustrated in FIG. 7(c), when the DtoK index 122 is added, identification information (document ID) of a document corresponding to that DtoK index 122 is set. This document ID is set independently of the identification information di of the DtoK index 122 registered in the DtoK list "DLList". For example, the largest value of the document IDs that have been used so far may be retained and a value that is larger than the largest value by one may be used as a value of a newly set document ID. This enables, as illustrated in FIG. 7(d), to delete the DtoK index 122 corresponding to the entry at the end of the DtoK list "DLList" by deleting the DtoK index 122 whose value of the document ID is the smallest.

In the example illustrated in FIG. 8, a link of a word having identification information "200", created from the DtoK index 122(3) to the DtoK index 122(5), is illustrated. In the illustrated example, the document ID of the DtoK index 122(3) is "10", and the document ID of the DtoK index 122(5) is "6". Also, in the DtoK index 122(3), the word having the identification information "200" is registered in the second entry "Entry[1]". With reference to the entry "Entry[1]" in the DtoK index 122(3), the point value of the word having the identification information "200" is "1.5". Also, the linked destination is the entry "Entry[2]" in the DtoK index 122 having the document ID "6". Thus, the third entry "Entry[2]" in the linked DtoK index 122(5), which is the linked destination, registers the word having the identification information "200".

In the example illustrated in FIG. 8, suppose that the document having the document ID "6" is deleted. When the DtoK list "DLList" and the DtoK indices 122 are updated, the DtoK index 122(5) having the document ID "6" is deleted. Due to this, the DtoK index 122(5) having the document ID "6" disappears from the DtoK list "DLList". Thus, it is no longer possible to follow the link from the entry "Entry[1]" in the DtoK index 122(3) to the entry "Entry[2]" in the DtoK index 122(5). And the link of the word having the identification information "200" now terminates at the entry "Entry[1]" in the DtoK index 122(3).

<Another Configuration and Implementation of Index>

In the above described embodiment, the links between words registered in the word list 121 and the DtoK indices 122(1) to 122(n) were created from the identification information registered in the word list 121 in order of the identification information di. Depending on the implementation of the DtoK index 122, however it may be preferred to set links in descending order of the identification information di (that is, from older documents to newer documents).

Figure 10:
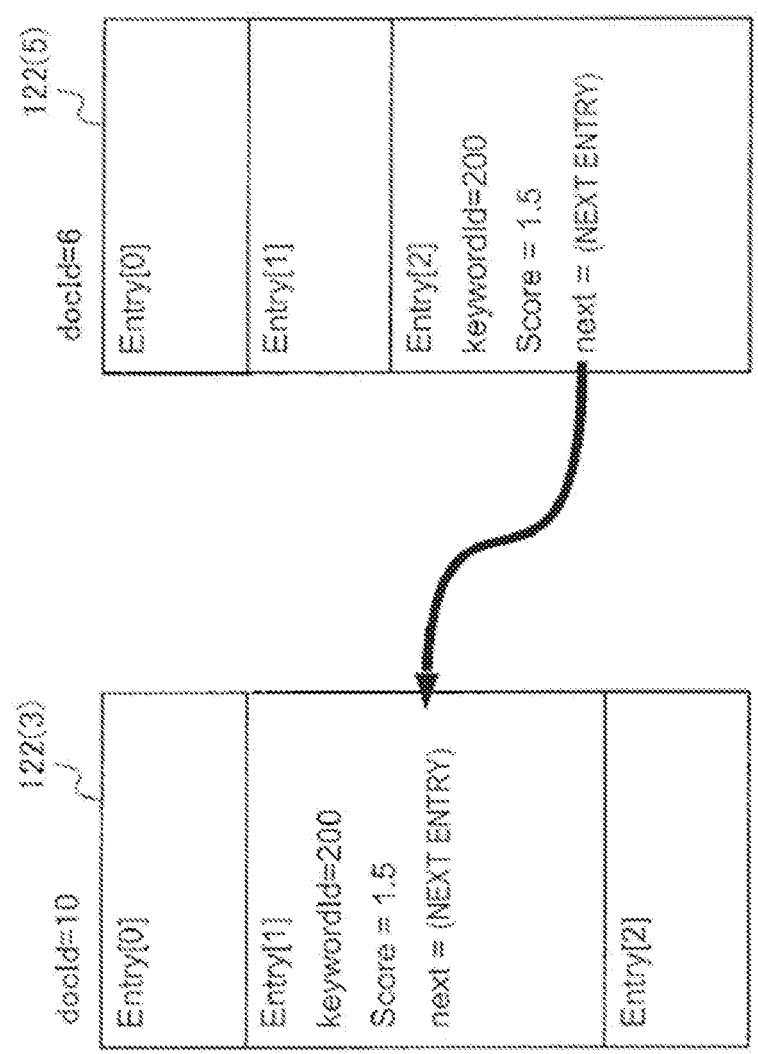
FIG. 10 is a diagram illustrating the other example of implementing a DtoK index using Java programming language, wherein a link created by the coding in FIG. 9 is illustrated.

FIGS. 9 and 10 are diagrams illustrating another example of implementing the DtoK index 122 of the embodiment using Java programming language. FIG. 9 is a diagram illustrating an example of coding for setting an entry of the DtoK index 122. FIG. 10 is a diagram illustrating a link created by the coding illustrated in FIG. 9. It is supposed that the coding for generating the DtoK list, the coding for adding a new DtoK index 122, and the coding for deleting the DtoK index 122 are similar to those illustrated in FIGS. 7(b) to 7(d).

According to the implementation illustrated in FIG. 9, a link between words (entries) in the DtoK indices 122 is achieved by directly pointing to a linked entry by using a pointer. In the example illustrated in FIG. 9, an entry in the linked DtoK index 122 is specified by using a pointer (or similar mechanism) supported in a programming language such as Java and C/C++. In the illustrated example, the pointer is set in "Entry next". In the case of creating a ling by using a pointer like this, the link is created in a reverse direction compared with the implementation example illustrated in FIGS. 7 and 8. That is, a link of a particular word starts from an entry in the oldest DtoK index 122 (having the largest value of the identification information di) in which the word appears, and terminates at an entry of the word in the word list 121.

Also, in this implementation example, a link from an entry in the word list 121 to an entry in the oldest DtoK index 122 in which a linked word appears (hereinafter referred to as a reverse link) is also created. This reverse link is used when the aggregation processing unit 130 executes aggregation processing in the first technique for following the link of each word. That is, the aggregation processing unit 130 finds a starting point of a normal link by using a reverse link.

In the example illustrated in FIG. 10, a link of the word having identification information "200" is illustrated from the DtoK index 122(5) to the DtoK index 122(3), the direction of the link being opposite to the link in the example illustrated in FIG. 8. In the illustrated example, the document ID of the DtoK index 122(3) is "10", and the document ID of the DtoK index 122(5) is "6". Also, in the DtoK index 122(5), the word having the identification information "200" is registered in the third entry "Entry[2]". With reference to the entry "Entry[2]" in the DtoK index 122(5), the point value of the word having the identification information "200" is "1.5", and a pointer to the linked destination (the entry "Entry[1]" in the DtoK index 122(3)) is set. Therefore, the entry "Entry[1]" in the DtoK index 122(3), which is a linked destination, registers the word having the identification information "200".

Figure 11:
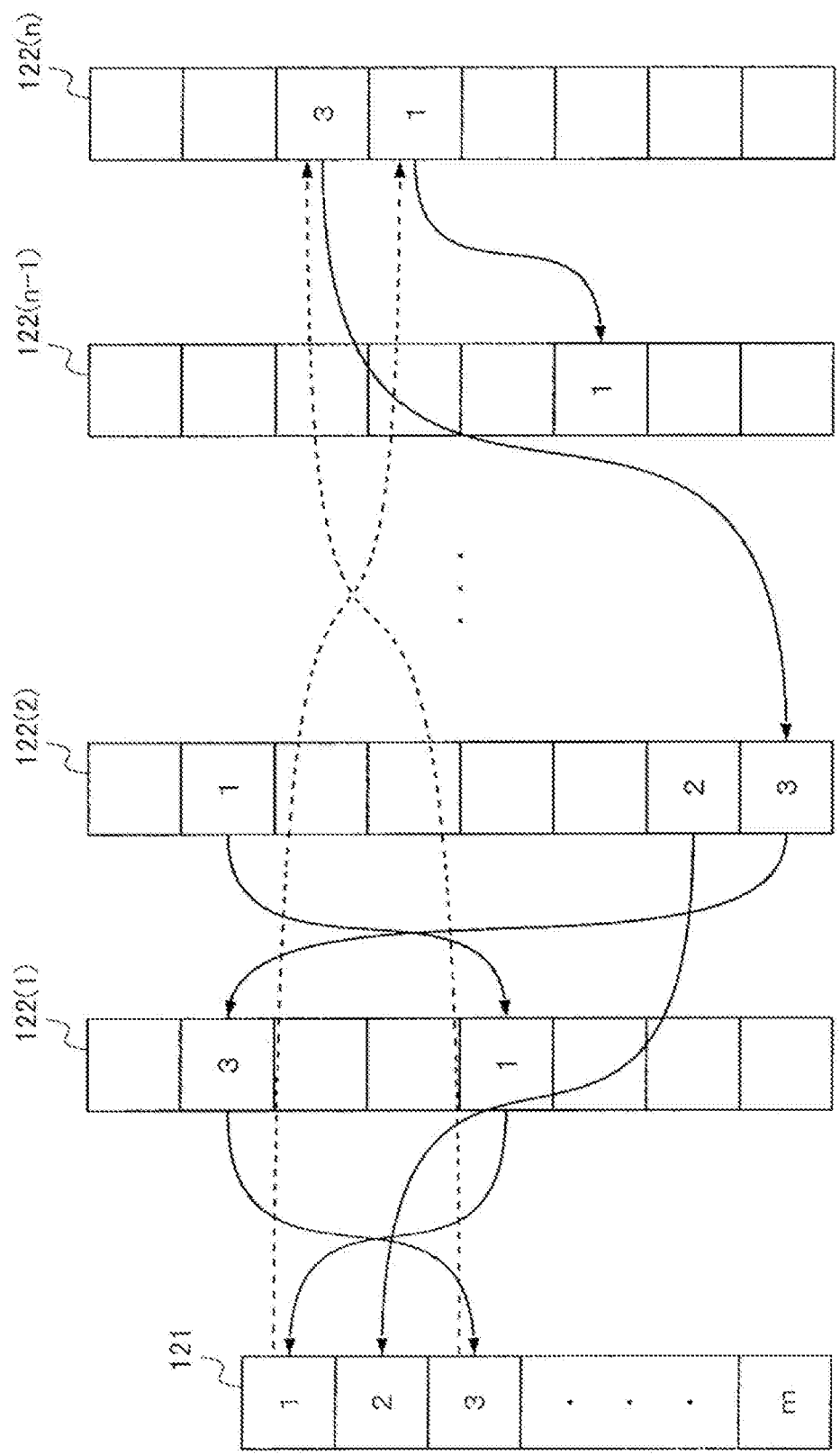
FIG. 11 is a diagram illustrating a configuration of indices according to the implementation example of FIGS. 9 and 10.

FIG. 11 is a diagram illustrating the configuration of the indices according to the implementation example of FIGS. 9 and 10. Like the configuration example illustrated in FIG. 2, the configuration example illustrated in FIG. 11 includes the word list 121 and the DtoK indices 122 of documents stored in the document DB 200. The DtoK indices 122 respectively correspond to n documents and have branch numbers (1) to (n), starting from the document that is most recently stored in the document DB 200 (the newest document).

In the index configuration illustrated in FIG. 11, a normal link and a reverse link for each word are illustrated, wherein the normal link extends from an entry of a word in the oldest document in which the word appears to an entry of the word in the word list 121. In FIG. 11, normal links and reverse links are illustrated with a solid line and a dashed line, respectively.

Specifically, the links illustrated in FIG. 11 will now be described in connection with the word having identification information "1" (word "1"). The normal link of the word "1" is initially created from an entry in the oldest DtoK index 122(n) in which the word "1" appears to an entry in the DtoK index 122(n−1). Although not illustrated, the link of the word "1" is created in descending order of the branch numbers of the DtoK indices 122 and reaches an entry in the DtoK index 122(2). The link of the word "1" then extends from the entry in the DtoK index 122(2) to an entry in the DtoK index 122(1) and terminates at an entry of the word "1" in the word list 121.

As with the configuration example illustrated in FIG. 2, the link is created so as to skip the DtoK index 122 that does not include the word "1". For example, in FIG. 11, the link of the word "2" is created from an entry in the DtoK index 122(2) to the entry of the word "2" in the word list 121, skipping the DtoK index 122(1). That is, the word "2" does not appear in the document corresponding to the DtoK index 122(1). Also, the link of the word "3" is created from an entry in the DtoK index 122(n) to an entry in the DtoK index 122(2). That is, the word "3" does not appear in the documents respectively corresponding to the DtoK indices 122(3) to 122(n−2), which are not illustrated.

Also, in the index configuration illustrated in FIG. 11, a starting point of a normal link of a word is not necessarily the DtoK index 112(n), which is the oldest of all indexes, but the oldest DtoK index 122 in which the word appears. For example, in the example illustrated in FIG. 11, consider the link of the word "2". The starting point of the link of the word "2" does not exist in either the DtoK index 122(n) or the DtoK index 122(n−1). Thus, the starting point of the link of the word "2" is any one of the DtoK indices 122 that are newer than the DtoK index 122(n−1).

Also, the reverse link of the word "1" is created from the entry of the word "1" in the word list 121 to the entry in the DtoK index 122(n), which is the oldest of all indices in which the word "1" appears. The reverse link of the word "3" is also created in a similar manner. On the other hand, the reverse link of the word "2" is not illustrated because the oldest DtoK index 122 in which the word "2" appears is not illustrated. This means that the oldest DtoK index 122 in which the word "2" appears is any one of the DtoK indices 122(3) to 122(n−2).

In the implementation example described above with reference to FIGS. 9 to 11, update for adding a new DtoK index 122 can be executed in similar steps to those illustrated in FIG. 6, except that the direction of the link is inverted. As for creating a link, if the selected word is registered in the word list 121 in S505 of FIG. 6 (Yes in S505), then the index updating unit 150 updates the pointer of the entry of that word in the added DtoK index 122 so that the pointer points to the entry of that word in the word list 121. Also, the index updating unit 150 follows the reverse link and the normal link from the entry of the word in the word list 121, and detects entries in the DtoK indices 122 having a pointer currently pointing to the entry of the word in the word list 121. Then, the index updating unit 150 updates the pointer of the detected entries in the DtoK indices 122 so that the pointer points to the entry of that word in the added DtoK index 122.

On the other hand, if the selected word is not registered in the word list 121 in S505 of FIG. 6 (No in S505), the index updating unit 150 adds an entry of the selected word to the word list 121. Then, the index updating unit 150 creates a link by updating the pointer of the entry of the word in the added DtoK index 122 so that the pointer points to the entry of the word in the word list 121. Also, the index updating unit 150 creates a reverse link by updating the pointer of the entry of the word in the word list 121 so that the pointer points to the entry of the word in the added DtoK index 122.

On the other hand, in the case of update that deletes the DtoK index 122, not only the DtoK index 122 is simply deleted but also links created for each word stored in that DtoK index 122 are updated. Each word stored in the oldest DtoK index 122 to be deleted is both a starting point of a normal link of that word and a linked destination of a reverse link of the word. Thus, it is necessary to updates these normal and reverse links after deleting the DtoK index 122 so that the links can be followed appropriately.

Figure 12:
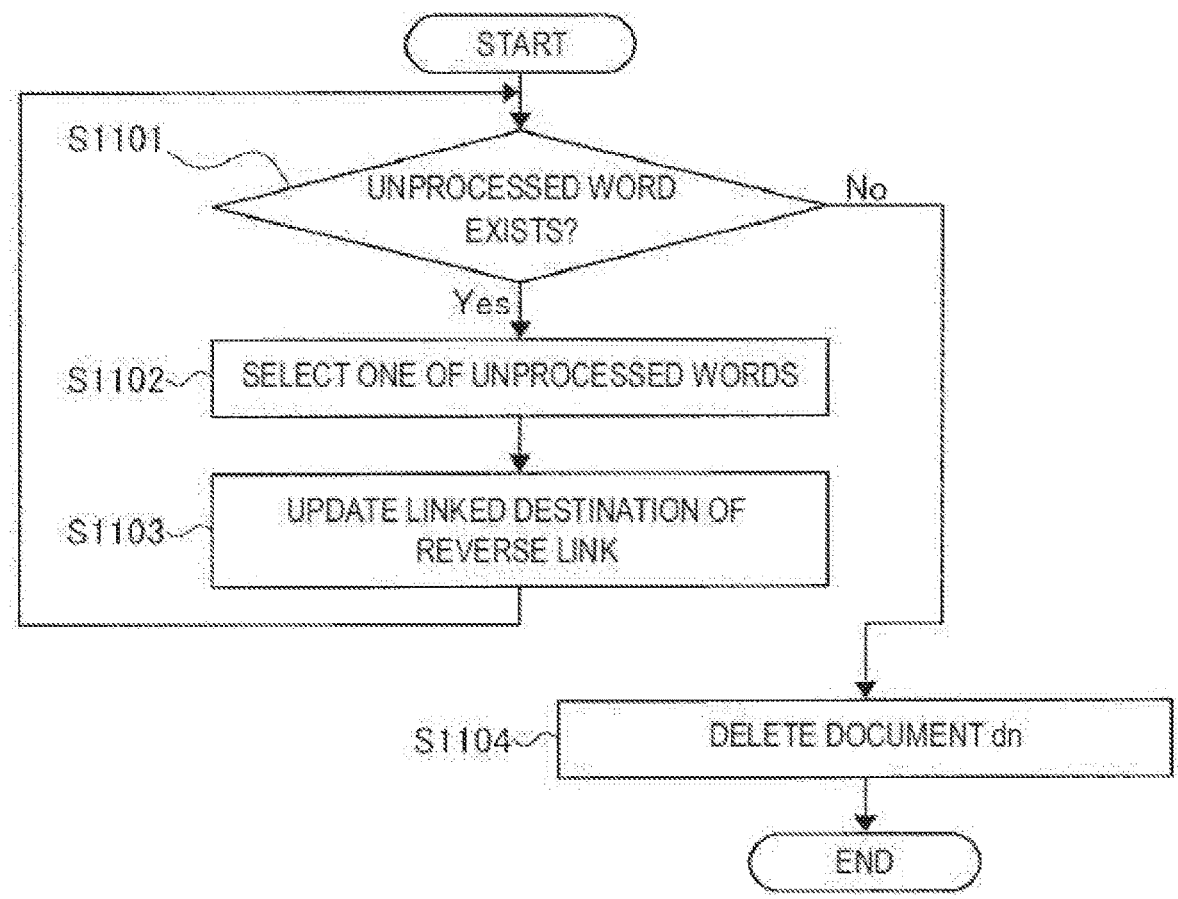
FIG. 12 is a flow chart illustrating steps of deleting a DtoK index in the implementation example of FIGS. 9 to 11.

FIG. 12 is a flow chart illustrating the steps of deleting the DtoK index 122 in the implementation example of FIGS. 9 to 11. As illustrated in FIG. 12, the index updating unit 150 firstly determines whether an unprocessed word (that is, a word whose links are not updated) exists among the words registered in the DtoK index 122(n) to be deleted (S1101). If one or more unprocessed words exist (Yes in S1101), then the index updating unit 150 selects one of the unprocessed words (S1102) and updates a linked destination of a reverse link created for the selected word (S1103).

Specifically, the index updating unit 150 obtains the information about a pointer pointing to a linked destination of a normal link registered in an entry of the selected word in the DtoK index 122(n) to be deleted. After deleting the DtoK index 122(n), the linked DtoK index 122 pointed by the pointer becomes the oldest DtoK index 122 in which the selected word appears. The index updating unit 150 updates a pointer that points to a linked destination of a reverse link of the selected word in the word list 121 on the basis of the obtained information about the pointer.

The index updating unit 150 executes the above described processing of S1102 to S1103 for each word registered in the DtoK index 122(n) to be deleted. This resets a reverse link of each word in the DtoK index 122(n) so as to point to the oldest DtoK index 122 in which the word appears after deleting the DtoK index 122(n). When no more unprocessed word exists (No in S1101), then the index updating unit 150 deletes the DtoK index 122(n) (S1104) and completes the processing.

Figure 13:
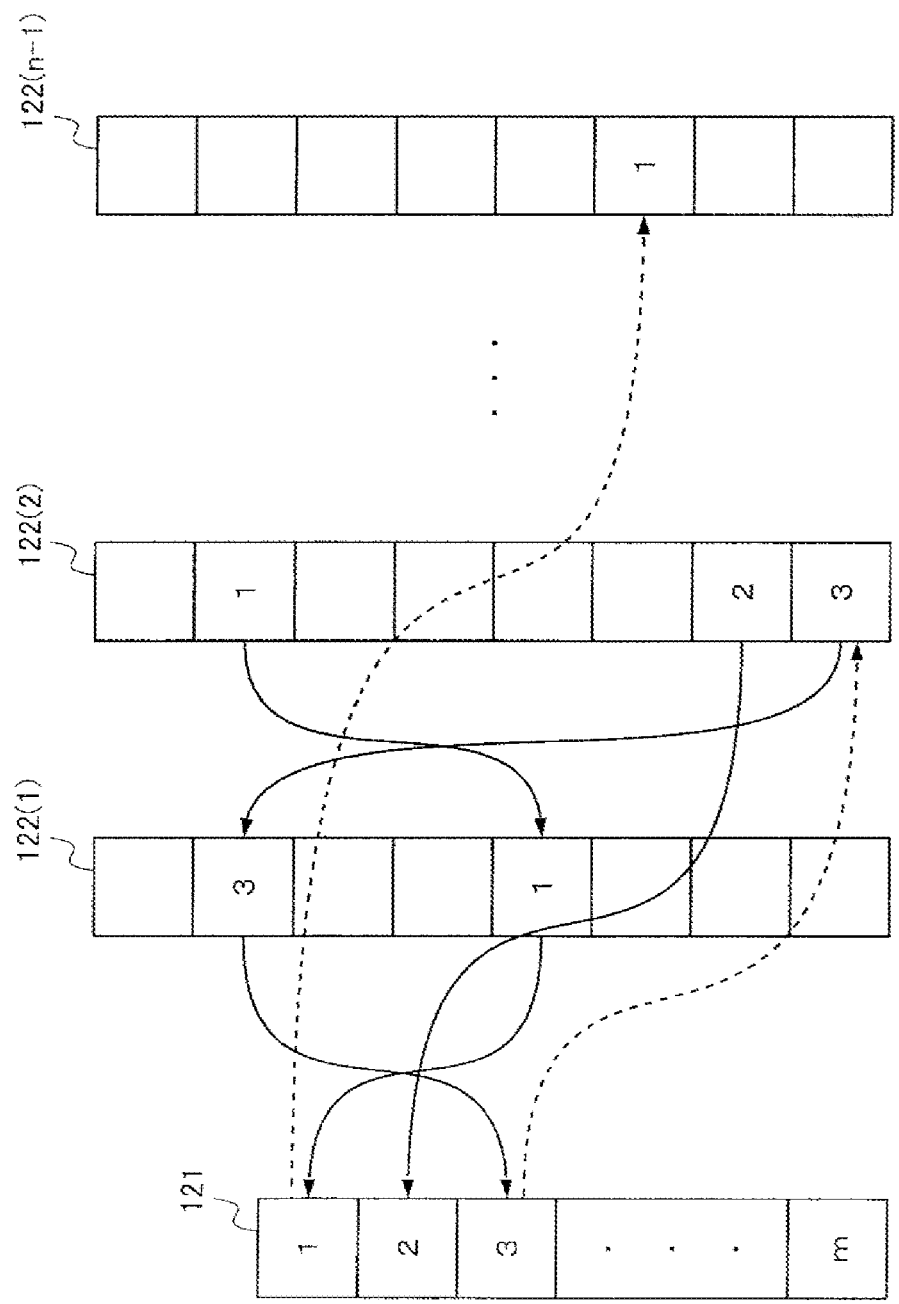
FIG. 13 is a diagram illustrating a situation after a DtoK index is deleted in the configuration of indices illustrated in FIG. 11.

FIG. 13 is a diagram illustrating the situation after the DtoK index 122(n) is deleted in the configuration of indices illustrated in FIG. 11. With reference to FIG. 13, due to the deletion of the DtoK index 122(n), a starting point of a normal link (a linked destination of a reverse link) of the word "1" is now the entry for the word "1" in the DtoK index 122(n−1). Also, a starting point of a normal link (a linked destination of a reverse link) of the word "3" is now the entry for the word "3" in the DtoK index 122(2).

<Hardware Configuration Example>

Figure 14:
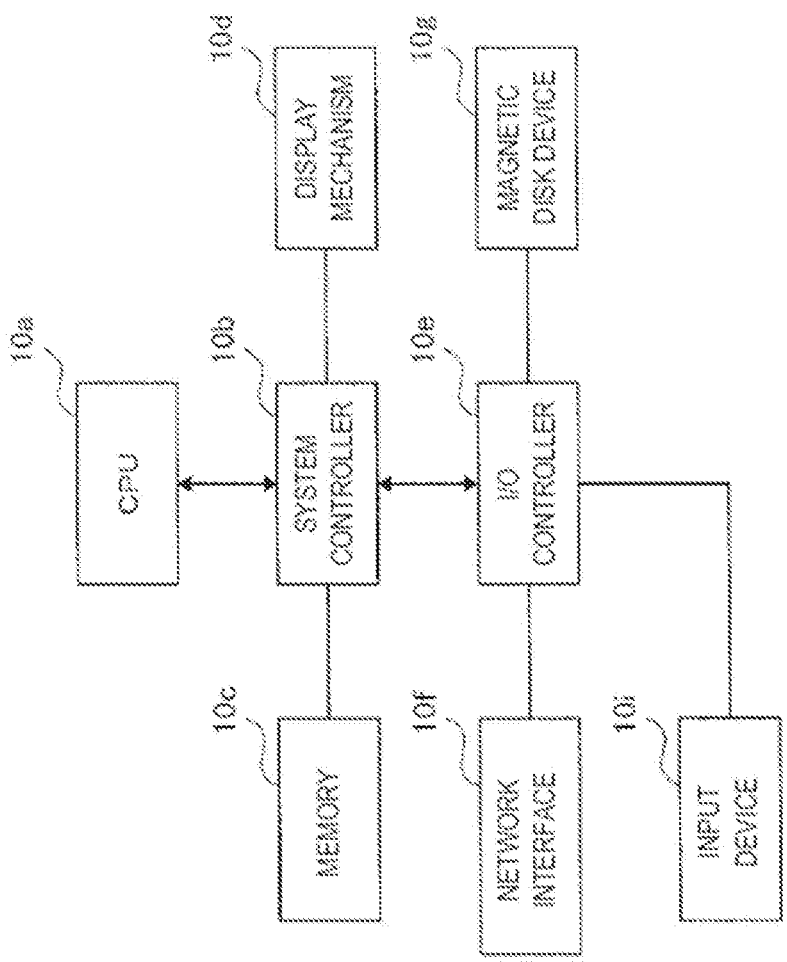
FIG. 14 is a diagram illustrating an example of a preferred hardware configuration for configuring the aggregation system of the embodiment.

FIG. 14 is a diagram illustrating an example of a preferred hardware configuration for configuring the aggregation system 100 of the embodiment. Here, the case of configuring the aggregation system by a computer will be described. The computer illustrated in FIG. 14 includes a CPU (Central Processing Unit) 10a as computing means and a memory 10c as main storage means. The computer also includes a magnetic disk device (HDD: Hard Disk Drive) 10g, a network interface 10f, a display mechanism 10d including a display device, and an input device 10i, such as a keyboard and a mouse, as external devices.

In the configuration example illustrated in FIG. 14, the memory 10c and the display mechanism 10d are connected to the CPU 10a via a system controller 10b. Also, the network interface 10f, the magnetic disk device 10g, and the input device 10i are connected to the system controller 10b via an I/O controller 10e. Each of these components is connected through various kinds of a bus such as a system bus and an input/output bus.

In FIG. 14, the magnetic disk device 10g stores an OS program and application programs. By loading these programs into the memory 10c and executing these programs by the CPU 10a, each function of the aggregation processing unit 130, the determination unit 140, and the index updating unit 150 of the aggregation system 100 is realized. Also, the index storing unit 120 is realized with the memory 10c and the magnetic disk device 10g. Also, the input receiving unit 110 is realized with the input device 10i and the programmatically controlled CPU 10a. Furthermore, in the embodiment, the document DB 200 may be realized with the magnetic disk device 10g. Please note that FIG. 14 simply illustrates, as an example, a preferred hardware configuration of a computer for realizing the aggregation system 100 of the embodiment and that the specific configuration of the aggregation system 100 is not limited to the configuration illustrated in FIG. 14.

The embodiment, which has been described, is not limited to the specific configurations described above. The embodiment may be widely applied to aggregation processing that finds a predetermined number of attributes appearing in an aggregation of target data items having a plurality of types of attributes in descending order of a point value given to each attribute on the basis of some kind of a rule. That is, the target data items of aggregation processing to which the embodiment is applied are not limited to documents that are narrowed down as a processing target as described above. Also, the attributes in aggregation processing to which the embodiment is applied are not limited to words included in each document. Other various changes or modifications made to the above described embodiment are also included in the technical scope of the present invention.

REFERENCE SIGNS LIST

100 . . . aggregation system, 110 . . . input receiving unit, 120 . . . index storing unit, 121 . . . word list, 122 . . . DtoK index, 130 . . . aggregation processing unit, 140 . . . determination unit, 150 . . . index updating unit.

What is claimed is:

1. An information processing system for aggregating data, the information processing system comprising:
    memory;
    a processor communicatively coupled to the memory; and
    an index storing unit for storing indices arranged in a predetermined order, each of the indices specifying a first list of attributes of the same type included in one target data item of a plurality of target data items of aggregation processing from identification information of the target data item, each element of the first list comprising information about an attribute of the attributes, and further storing a second list of attributes included across the plurality of target data items, wherein attributes of the first list of attributes and attributes of the second list of attributes are of the same type; and
    an aggregation processing unit for
        determining that at least a first aggregation processing operation and a second aggregation processing operation are available, wherein the first aggregation operation is based on determining target data items comprising a given attribute to be aggregated and wherein the second aggregation operation is based on determining, for each of a plurality of target data items, attributes included therein to be aggregated;

determining, based on contents of the indices, that aggregation efficiency is reduced by utilizing the second aggregation processing operation, executing, based on determining that aggregation efficiency is reduced by utilizing the second aggregation processing operation, the first aggregation processing operation, wherein executing the first aggregation processing operation comprises finding, for each attribute, the target data items comprising the attribute and aggregating attributes whose relation with the target data items meets a predetermined standard, wherein a link is created for each attribute in the second list to any instance of an identical attribute included in the first list of attributes of each index for sequentially following an element in the first list for each target data item, and wherein the aggregation processing unit finds the target data items including each attribute based on the link created for the attribute.

2. The information processing system according to claim 1, wherein the link is created by including, in each element of the first list for each target data item, information specifying another element comprising information about a same attribute as the each element in another first list nearest and subsequent to the first list.

3. The information processing system according to claim 1, wherein the attributes in the second list are sorted in descending order of their frequencies of being included in each of the plurality of the target data items.

4. The information processing system according to claim 1, wherein each element of the first list for each target data item further comprises a value given to the attribute identified by the information included in the element, and elements of the first list are sorted based on the value.

5. The information processing system according to claim 4, wherein the value given to the attribute is a weight value based on a relation between the attribute and the target data items comprising the attribute, and the elements of the first list are sorted in descending order of the value.

6. The information processing system according to claim 1, wherein each of the first lists respectively corresponding to the target data items are arranged in reverse chronological order of their creation so that an oldest first list is positioned at an end of the order, and wherein, in a case where a newly created first list is added, the newly created first list is positioned at a top of the order and the link relating to an attribute included in an element of the newly created first list is updated.

7. The information processing system according to claim 1, wherein each of the first lists respectively corresponding to the target data items are arranged in reverse chronological order of their creation so that an oldest first list is positioned at an end of the order, and wherein, on condition that an oldest first list is deleted, the first list at the end of the order is deleted and the link relating to an attribute included in an element of the deleted first list is updated.

8. A method, by an information processing system, of aggregating data, the method comprising:

storing indices arranged in a predetermined order, each of the indices specifying a first list of attributes included in one target data item of a plurality of target data items of aggregation processing from identification information of the target data item, each element of the first list comprising information about an attribute of the attributes;

storing a second list of attributes of the same type included in a across the plurality of target data items, wherein attributes of the first list of attributes and attributes of the second list of attributes are of the same type;

storing a link structure comprising a link for each attribute in the second list to any instance of an identical attribute included in the first list of attributes of each index, the link structure for sequentially following, for each element in the second list, an element in the first list for each target data item;

determining that at least a first aggregation processing operation and a second aggregation processing operation are available, wherein the first aggregation operation is based on determining target data items comprising a given attribute to be aggregated and wherein the second aggregation operation is based on determining, for each of a plurality of target data items, attributes included therein to be aggregated;

determining, based on contents of the indices, that aggregation efficiency is reduced by utilizing the second aggregation processing operation;

executing, based on determining that aggregation efficiency is reduced by utilizing the second aggregation processing operation, the first aggregation processing operation, wherein executing the first aggregation processing operation comprises determining a count of the target data items comprising each attribute based on the link structure created for the attribute, aggregating a top predetermined number of the attributes included in a larger number of the target data items, and outputting a result of the aggregation.

9. The method according to claim 8, wherein storing the link structure comprises:

storing, in each element of the first list for each target data item, information specifying another element comprising information about a same attribute as the each element in another first list nearest and subsequent to the first list.

10. The method according to claim 8, wherein the attributes in the second list are sorted in descending order of their frequencies of being included in each of the plurality of the target data items.

11. The method according to claim 8, wherein each element of the first list for each target data item further comprises a value given to the attribute identified by the information included in the element, and elements of the first list are sorted based on the value.

12. The method according to claim 11, wherein the value given to the attribute is a weight value based on a relation between the attribute and the target data items comprising the attribute, and the elements of the first list are sorted in descending order of the value.

13. The method according to claim 8, wherein the first lists respectively corresponding to the target data items are arranged in reverse chronological order of their creation so that an oldest first list is positioned at the end of the order, and wherein, in a case where a newly created first list is added, the newly created first list is positioned at the top of the order and the link relating to an attribute included in an element of the newly created first list is updated.

14. The method according to claim 8, wherein the first lists respectively corresponding to the target data items are arranged in reverse chronological order of their creation so that an oldest first list is positioned at an end of the order, and wherein, on condition that the oldest first list is deleted, the first list at the end of the order is deleted and the link relating to an attribute included in an element of the deleted first list is updated.

15. A method, by an information processing system, of aggregating data, the method comprising:
   storing a plurality of indices, wherein each index in the plurality of indices comprises a list registering attributes included in one target data item of a plurality of target data items of aggregation processing;
   determining that at least a first operation and a second operation is available for aggregation processing, the first operation being an operation for finding, for each attribute, target data items comprising the attribute and aggregating attributes whose relation with the target data items meets a predetermined standard, the second operation being an operation for finding, for each of target data items, attributes included in the target data item and aggregating attributes whose relation with the target data items meets a predetermined standard;
   determining, based at least on the plurality of indices, that one of the first operation or the second operation increases efficiency of the aggregation process;
   in response to determining that aggregation processing is to be executed in the first operation based on the first operation increasing aggregation processing efficiency over the second operation, finding, the target data items comprising the attribute based on a relation between identical attributes in the plurality of indices creating the relation between identical attributes included in different target data items; and
   in response to determining that aggregation processing is to be executed in the second operation based on the second operation increasing aggregation processing efficiency over the first operation, finding the attributes included in each of target data items and aggregating attributes whose relation with the target data items meets a predetermined standard based on the indices.

16. The method according to claim 15, further comprising:
   storing a second list of attributes included in a plurality of the target data items; and
   storing a link structure for sequentially following, for each element in the second list, an element in the first list for each target date item,
   wherein the attributes in the second list are sorted in descending order of their frequencies of being included in each of the plurality of the target data items.

17. The method according to claim 15, wherein each element of the of the list registering attributes comprises a value given to the attribute identified by the information included in the element, and
   elements of the list registering attributes are sorted based on the value.

18. The method according to claim 17, wherein the value given to the attribute is a weight value based on a relation between the attribute and the target data items comprising the attribute, and
   the elements of the list registering attributes are sorted in descending order of the value.

19. The method according to claim 15, wherein each of the lists registering attributes are arranged in reverse chronological order of their creation so that an oldest list registering attribute is positioned at an end of the order, and wherein, in response to a newly created list registering attributes is added, the newly created list registering attributes is positioned at an top of the order.

20. The method according to claim 15, wherein the lists registering attributes are arranged in reverse chronological order of their creation so that an oldest first list is positioned at an end of the order, and wherein, on condition that the oldest list registering attributes is deleted, the list registering attributes at the end of the order is deleted.

\* \* \* \* \*